(12) United States Patent
Xing (10) Patent No.: US 11,915,035 B1
(45) Date of Patent: Feb. 27, 2024

(54) TASK STATE UPDATING METHOD AND APPARATUS, DEVICE, AND MEDIUM

(71) Applicant: SHANDONG YINGXIN COMPUTER TECHNOLOGIES CO., LTD., Shandong (CN)

(72) Inventor: Liangzhan Xing, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 18/268,307

(22) PCT Filed: Jan. 28, 2022

(86) PCT No.: PCT/CN2022/074599
§ 371 (c)(1),
(2) Date: Jun. 19, 2023

(87) PCT Pub. No.: WO2022/193855
PCT Pub. Date: Sep. 22, 2022

(30) Foreign Application Priority Data

Mar. 18, 2021 (CN) .......................... 202110290936.2

(51) Int. Cl.
*G06F 9/455* (2018.01)
*G06F 11/30* (2006.01)
*G06N 20/00* (2019.01)

(52) U.S. Cl.
CPC ...... *G06F 9/45558* (2013.01); *G06F 11/3055* (2013.01); *G06N 20/00* (2019.01); *G06F 2009/4557* (2013.01)

(58) Field of Classification Search
CPC ............. G06F 9/45558; G06F 11/3055; G06F 2009/4557; G06N 20/00
See application file for complete search history.

(56) References Cited

U.S. PATENT DOCUMENTS

| 2014/0013247 | A1 | 1/2014 | Beechuk et al. |
| 2019/0228303 | A1* | 7/2019 | Liu ................... G06F 18/24143 |
| 2020/0301782 | A1 | 9/2020 | Radhakrishnan et al. |

FOREIGN PATENT DOCUMENTS

| CN | 107666525 A | 2/2018 |
| CN | 108039975 A | 5/2018 |

(Continued)

OTHER PUBLICATIONS

R. Ciucu, F. C. Adochiei, I.-R. Adochiei, F. Argatu, G. C. Seritan, B. Enache, S. Grigorescu, and V. V. Argatu, "Innovative DevOps for artificial intelligence," Sci. Bull. Electr. Eng. Fac., vol. 19, No. 1, pp. 58-63, Apr. 2019 (Year: 2019).*

(Continued)

*Primary Examiner* — Jacob D Dascomb
(74) *Attorney, Agent, or Firm* — Cooper Legal Group LLC (57) ABSTRACT

The present application discloses a task status updating method including: listening for K8S events by using a K8S event listener to obtain a Pod status change event, and generating a Pod status update event based on the Pod status change event (S12); listening for the Pod status update event by using a Pod status change event listener, determining a Pod status corresponding to the Pod status update event as a Pod status of a corresponding target task in the deep learning platform when the Pod status update event is listened out, and generating a task status update event (S13); and listening for the task status update event by using a task status change event listener, and updating a current status of the target task as the Pod status of the target task when the task status update event is listened out (S14).

20 Claims, 6 Drawing Sheets

(56) References Cited

FOREIGN PATENT DOCUMENTS

| | | |
|---|---|---|
| CN | 109831500 A | 5/2019 |
| CN | 110162471 A | 8/2019 |
| CN | 110213309 A | 9/2019 |
| CN | 110321115 A | 10/2019 |
| CN | 110502340 A | 11/2019 |
| CN | 110912972 A | 3/2020 |
| CN | 111352717 A | 6/2020 |
| CN | 111427665 A | 7/2020 |
| CN | 111431740 A | 7/2020 |
| CN | 111538563 A | 8/2020 |
| CN | 111741257 A | 10/2020 |
| CN | 111897625 A | 11/2020 |
| CN | 112000363 A | 11/2020 |
| CN | 112039963 A | 12/2020 |
| CN | 112068935 A | 12/2020 |
| CN | 112087522 A | 12/2020 |
| CN | 112104486 A | 12/2020 |
| CN | 112104723 A | 12/2020 |
| CN | 112433818 A | 3/2021 |
| CN | 112486634 A | 3/2021 |
| CN | 113010385 A | 6/2021 |

OTHER PUBLICATIONS

Wenjia Zheng, Michael Tynes, Henry Gorelick, Ying Mao, Long Cheng, and Yantian Hou. 2019. FlowCon: Elastic flow configuration for containerized deep learning applications. In Proceedings of the 48th International Conference on Parallel Processing (ICPP'19). ACM, New York, NY, Article 87, 10 pages (Year: 2019).*
Corresponding International Patent Application No. PCT/CN2022/074599, International Search Report, dated Apr. 15, 2022.
Corresponding International Patent Application No. PCT/CN2022/074599, Written Opinion, dated Apr. 15, 2022.
Corresponding Chinese Patent Application No. 202110290936.2, First Office Action dated Apr. 1, 2022.
Corresponding Chinese Patent Application No. 202110290936.2, Notification to Grant Patent, dated Jul. 29, 2022.

* cited by examiner

TASK STATE UPDATING METHOD AND APPARATUS, DEVICE, AND MEDIUM

This application claims priority to Chinese Patent Application No. 202110290936.2, filed on Mar. 18, 2021 in China National Intellectual Property Administration and entitled "Task Status Updating Method and Apparatus, Device, and Medium", which is hereby incorporated by reference in its entirety.

FIELD

The present application relates to the field of computer technology, in particular to a task status updating method and apparatus, a device, and a medium.

BACKGROUND

At present, artificial intelligence technologies represented by deep learning have achieved rapid development, and these technologies are used in various industries. With the widespread use of deep learning, a lot of strong demands in terms of efficient and convenient training of artificial intelligence models are produced in many fields, where the training relies on a deep learning training platform. Management on the deep learning platform requires control on platform tasks. One of the most important aspects is management on a life cycle of a task, and such management relies on a status update mechanism of the task.

In current technologies, most deep learning platforms support update of a platform task status. The status of a training task is mainly updated in two ways. One way is to query an API provided by an underlying kubernetes (hereinafter referred to as K8S) platform in real time and return status information of a Pod in real time, and then a platform maps and returns the status information of the task. The other way is to schedule tasks in a background by querying an API provided by an underlying K8S platform and return status information of a Pod, and then a platform maps the status information of the task and saves the status information in a database of the platform. The foregoing two task updating ways cannot adapt well to task status updates in large-scale cluster, multi-user parallel use, and mass task running scenarios, may even lead to inaccurate completion of training tasks, and cannot accurately display task status information and other related information. As a result, problems may occur when users use deep learning platforms. Therefore, how to accurately and effectively update a task status in real time and solve a problem of slow response to task status query in large-scale cluster, multi-user parallel use, and mass task running scenarios has become a key step for gradual improvement of deep learning platforms.

SUMMARY

In view of this, the objective of the present application is to provide a task status updating method and apparatus, a device, and a medium, whereby the real-time performance and accuracy of task status update in large-scale cluster, multi-user parallel use, and mass task running scenarios are improved, and the response speed of task status query is also improved. The solutions are as follows:

A first aspect of the present application provides a task status updating method, applied to a deep learning platform, including:

creating a K8S event listener, a Pod status change event listener, and a task status change event listener;

listening for K8S events by using the K8S event listener to obtain a Pod status change event, and generating and publishing a corresponding Pod status update event based on the Pod status change event;

listening for the Pod status update event by using the Pod status change event listener, determining a Pod status corresponding to the Pod status update event as a Pod status of a corresponding target task in the deep learning platform in response to the Pod status change event listener listening out the Pod status update event, and generating and publishing a task status update event corresponding to the target task; and listening for the task status update event by using the task status change event listener, and updating a current status of the target task as the Pod status of the target task in response to the task status change event listener listening out the task status update event.

In an embodiment, the step of listening for K8S events by using the K8S event listener to obtain a Pod status change event includes:

listening for the K8S events by using the K8S event listener, and filtering the listened K8S events to obtain the Pod status change event.

In an embodiment, the step of filtering the listened K8S events includes:

filtering the K8S events according to space names of the listened K8S events.

In an embodiment, the step of generating and publishing a corresponding Pod status update event based on the Pod status change event includes:

extracting target data from a first data message corresponding to the Pod status change event, and reconstructing a second data message by using the target data; and generating and publishing the corresponding Pod status update event according to the reconstructed second data message.

In an embodiment, the step of determining a Pod status corresponding to the Pod status update event as a Pod status of a corresponding target task in the deep learning platform includes:

mapping Pod status data corresponding to the Pod status update event to the Pod status of the corresponding target task in the deep learning platform through a Pod status mapper.

In an embodiment, the step of updating a current status of the target task as the Pod status of the target task includes:

mapping the Pod status of the target task to the current status of the target task through a task status mapper.

In an embodiment, after updating the current status of the target task as the Pod status of the target task, the method further includes:

unsubscribing the K8S event listener, the Pod status change event listener, and the task status change event listener.

A second aspect of the present application provides a task status updating apparatus, applied to a deep learning platform, including:

a creating module, configured to create a K8S event listener, a Pod status change event listener, and a task status change event listener;

a first listening module, configured to listen for K8S events by using the K8S event listener to obtain a Pod status change event, and generate and publish a corresponding Pod status update event based on the Pod status change event;

a second listening module, configured to listen for the Pod status update event by using the Pod status change event listener, determine a Pod status corresponding to the Pod status update event as a Pod status of a corresponding target task in the deep learning platform in response to the Pod status change event listener listening out the Pod status update event, and generate and publish a task status update event corresponding to the target task; and a third listening module, configured to listen for the task status update event by using the task status change event listener, and update a current status of the target task as the Pod status of the target task in response to the task status change event listener listening out the task status update event.

A third aspect of the present application provides an electronic device, the electronic device including a processor and a memory, where the memory is configured to store a computer program, and the computer program is loaded and executed by the processor to implement the foregoing task status updating method.

A fourth aspect of the present application provides a computer-readable storage medium storing computer executable instructions, and the foregoing task status updating method is implemented when the computer executable instructions are loaded and executed by a processor.

In the present application, a K8S event listener, a Pod status change event listener, and a task status change event listener are first created; then K8S events are listened by using the K8S event listener to obtain a Pod status change event, and a corresponding Pod status update event is generated and published based on the Pod status change event; next, the Pod status update event is listened by using the Pod status change event listener, a Pod status corresponding to the Pod status update event is determined as a Pod status of a corresponding target task in the deep learning platform when the Pod status change event listener listens out the Pod status update event, and a task status update event corresponding to the target task is generated and published; and finally, the task status update event is listened by using the task status change event listener, and a current status of the target task is updated as the Pod status of the target task when the task status change event listener listens out the task status update event. In the present application, the K8S event, the Pod status update event, and the task status update event in a task status update process are listened and analyzed in real time by using the K8S event listener, the Pod status change event listener, and the task status change event listener separately to update a status of a task, and the foregoing steps deeply integrate capabilities of K8S, improve the real-time performance and accuracy of task status update in large-scale cluster, multi-user parallel use, and mass task running scenarios, and also improve the response speed of task status query.

BRIEF DESCRIPTION OF THE DRAWINGS

In order to describe the technical solutions in the embodiments of the present application or in the prior art more clearly, drawings required in the illustration of the embodiments or the prior art will be briefly introduced below. Apparently, the drawings in the illustration below are only some embodiments of the present application. Those ordinarily skilled in the art also can obtain other drawings according to the provided drawings without creative work.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, rather than all the embodiments. Based on the embodiments of the present application, all other embodiments obtained by those skilled in the art without creative work shall fall within the protection scope of the present application.

The existing task status updating way of querying in real time an API provided by an underlying K8S platform, returning status information of a Pod, mapping the status information of the Pod to task status information, and returning the task status information, or the task status updating way of scheduling tasks in a background, regularly querying an API provided by an underlying K8S platform, returning status information of a Pod, mapping the status information of the Pod to task status information, and saving the task status information in a database of the platform cannot adapt to task status update in large-scale cluster, multi-user parallel use, and mass task running scenarios. For the foregoing technical defects, the present application provides a task status update solution, where K8S events, a Pod status update event, and a task status update event in a task status update process are listened and analyzed in real time by using a K8S event listener, a Pod status change event listener, and a task status change event listener separately to update a status of a task, and capabilities of K8S are deeply integrated to improve the real-time performance and accuracy of task status update in large-scale cluster, multi-user parallel use, and mass task running scenarios, and also to improve the response speed of task status query.

Figure 1:
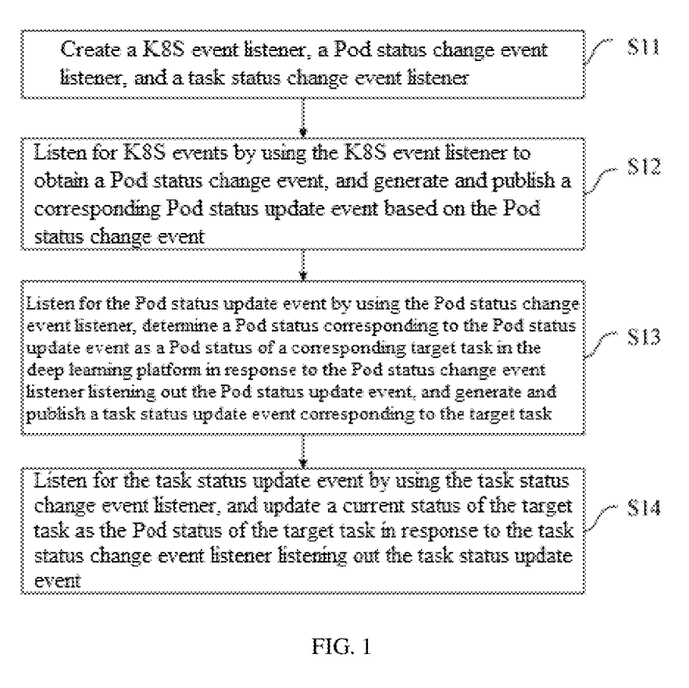
FIG. 1 is a flowchart of a task status updating method according to the present application.

FIG. 1 is a flowchart of a task status updating method according to an embodiment of the present application, applied to a deep learning platform. As shown in FIG. 1, the task status updating method includes:

S11: Create a K8S event listener, a Pod status change event listener, and a task status change event listener.

Figure 2:
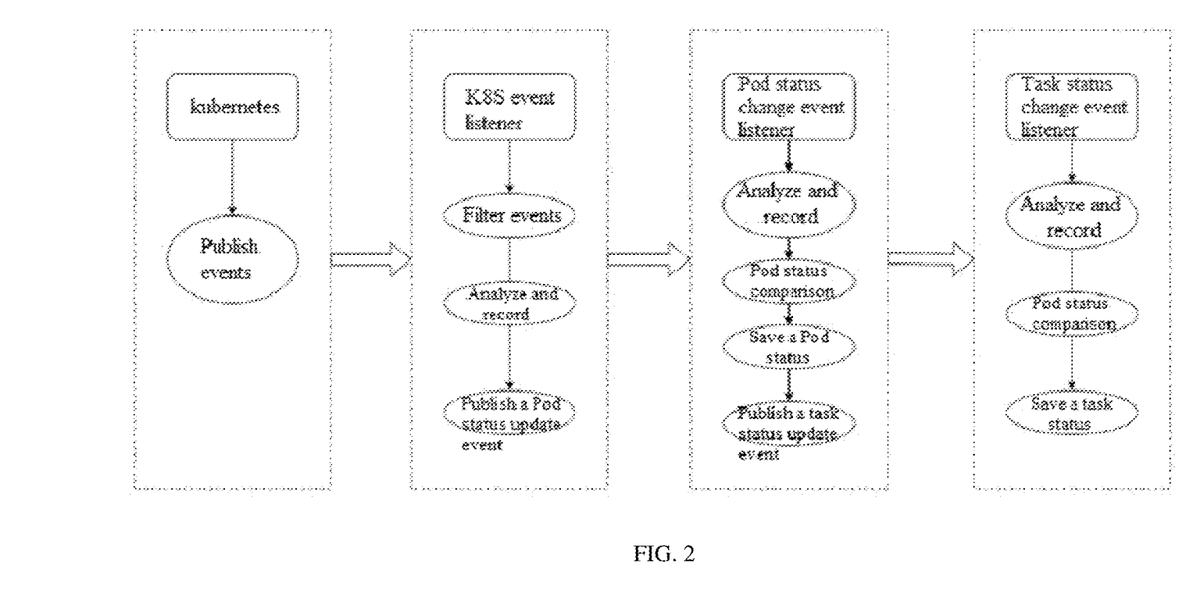
FIG. 2 is a schematic diagram of a certain task status updating method according to the present application.
Figure 3:
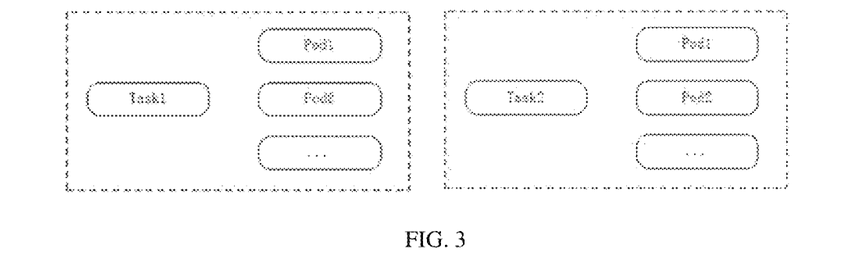
FIG. 3 is a schematic diagram of corresponding relationships between tasks and Pods according to the present application.

In this embodiment, when the deep learning platform is initiated, the K8S event listener, the Pod status change event listener, and the task status change event listener are created, as shown in FIG. 2. The K8S event listener is configured to listen for an event (Filter Event) published by an underlying K8S platform, the Pod status change event listener is configured to listen for a Pod status update event, and the task status change event listener is configured to listen for task status update time. K8S is an open source application used to manage containerization on a plurality of hosts in a cloud platform. K8S provides a mechanism for deploying, planning, updating, and maintaining applications. Various functions of management services are implemented by defining various types of resources, in order to make deployed containerized applications simple and efficient. In a K8S cluster, Pod is a foundation of all service types and a container or a combination of a plurality of containers, and the containers share a memory, a network, a namespace, and specifications for how to run. In the Pod, all the containers are uniformly arranged and scheduled, and run in a shared context, that is, the Pod is a task running container. A task may be run by a plurality of Pods simultaneously, but one Pod can only run one task. Corresponding relationships between Pods and tasks are shown in FIG. 3. K8S events are stored in Etcd, and record various major events during cluster operation, for example, events of resource objects such as Pod, Node, and Kubelet, or events of some custom resource objects. The Pod as a basic scheduling unit is a resource, and this embodiment only focuses on events of Pod resource objects.

It should be noted that a listening mechanism matches a listener and an event. AIStation is used as an example. AIStation is a deep learning platform that provides intelligent AI containerized deployment and more efficient distributed training for training tasks. AIStation is an artificial intelligence development resource platform for artificial intelligence enterprise training scenarios, may realize functions such as containerized deployment, visual development, and centralized management, provides users with extremely high-performance AI computing resources, achieves efficient computing power support, accurate resource management and scheduling, agile data integration and acceleration, procedural AI scenarios, and service integration, effectively connects the development environment, computing resources, and data resources, and improves development efficiency. Users can create different deep learning framework environments through the AIStation platform, freely develop models, debug the models through command line methods, and quickly submit the models to training platforms through development platforms, to achieve an integrated solution for development and training. K8S events can only be listened by listeners based on a K8S mechanism. Events in the deep learning platform AIStation are all based on a spring framework, so corresponding listeners are also implemented based on the spring framework. Therefore, the K8S event listener described in this embodiment is created based on a K8S system framework and can only listen for events on the K8S platform. The Pod status change event listener is created based on a Spring event mechanism of the deep learning platform to listen for Pod status update time. Similarly, the task status change event listener is also created based on the Spring event mechanism of the deep learning platform to listen for task status update time. In addition, quantities of the K8S event listener, the Pod status change event listener, and the task status change event listener may be flexibly set according to a quantity of events, an actual quantity of running tasks, and the like to improve event listening efficiency.

S12: Listen for K8S events by using the K8S event listener to obtain a Pod status change event, and generate and publish a corresponding Pod status update event based on the Pod status change event.

Figure 4:
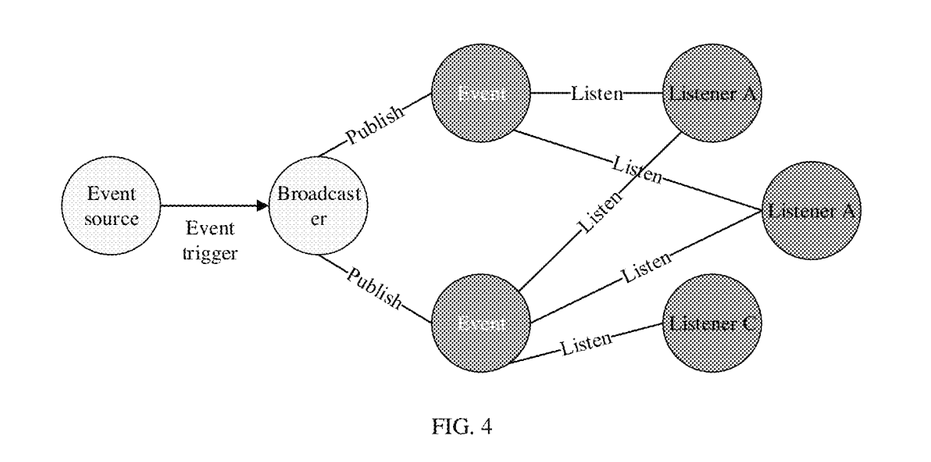
FIG. 4 is a schematic diagram of an event generating and publishing process according to the present application.

In this embodiment, the K8S event listener is initiated to listen for the K8S event to obtain the Pod status change event, and then the corresponding Pod status update event is generated and published based on the Pod status change event. As mentioned earlier, the K8S events record various major events during cluster operation, including but not limited to related events of Pod resource objects, and a resource that can represent a task status is a Pod resource. Therefore, in this embodiment, a compliant change event related to a Pod status, namely, the Pod status change event, needs to be filtered out from all K8S events. On this basis, the corresponding Pod status update event is generated based on the Pod status change event and published. An event source of the Pod status update event is the Pod status change event, and the Pod status update event is triggered and generated by the Pod status change event and published by a broadcaster, as shown in FIG. 4.

In an aspect, in terms of type, as logical architectures for creating the Pod status change event and the Pod status update event are different, types of listening mechanisms for the Pod status change event and the Pod status update event are different. In this embodiment, the creation basis of the Pod status update event is the Spring framework. On the other hand, in terms of information amount, the Pod status update event contains some data of the Pod status change event, and it may be considered that the Pod status update event contains condensed information of the Pod status change event.

S13: Listen for the Pod status update event by using the Pod status change event listener, determine a Pod status corresponding to the Pod status update event as a Pod status of a corresponding target task in the deep learning platform when the Pod status change event listener listens out the Pod status update event, and generate and publish a task status update event corresponding to the target task.

In this embodiment, the Pod status change event listener is initiated to listen in real time for the Pod status update event published by the deep learning platform. A quantity of the Pod status change event listener may be flexibly set according to a quantity of the Pod status update event. For example, the quantity of the Pod status change event listener may be positively correlated with the quantity of the Pod status update event. When the Pod status change event listener listens out the Pod status update event, the Pod status corresponding to the Pod status update event is determined as the Pod status of the corresponding target task in the deep learning platform. Meanwhile, the deep learning platform generates and publishes the task status update event corresponding to the target task. The method for generating and publishing the task status update event is consistent with the foregoing method for generating and publishing the Pod status update event. The task update event is triggered by the Pod status update event and published by the broadcaster.

S14: Listen for the task status update event by using the task status change event listener, and update a current status of the target task as the Pod status of the target task when the task status change event listener listens out the task status update event.

In this embodiment, the task status change event listener is initiated to listen for the task status update event in real time. Similarly, a quantity of the task status change event listener may be flexibly set according to a quantity of the task status update event, and the quantity of the task status change event listener is positively correlated with the quantity of the task status update event. When the task status change event listener listens out the task status update event, the current status of the target task is updated as the Pod status of the target task. As mentioned earlier, there is a corresponding relationship between a target task and a Pod. The same target task may correspond to a plurality of Pods, that is, the same target task may be run by a plurality of Pods at the same time, but the same Pod can only correspond to one target task at the same time. When the target task corresponds to only one Pod, that is, when the target task is run by one Pod, the status corresponding to the Pod is doubtlessly determined as the Pod status of the target task. When the target task corresponds to a plurality of Pods at the same time, that is, when the target task is run by a plurality of Pods at the same time, the current status of the target task is determined and updated after corresponding logical determination on statues corresponding to the plurality of Pods according to a preset rule. In an aspect, the task updating method described in this embodiment can update a task status more quickly compared with existing technologies in which status information of a corresponding task is determined by querying in real time an API provided by an underlying K8S platform and returning status information of a Pod in real time. On the other hand, the task updating method described in this embodiment can update a task status more accurately compared with existing technologies in which status information of a corresponding task is determined by regularly querying an API provided by an underlying K8S platform, returning status information of a Pod, and storing the status information of the Pod to a database of a deep learning platform.

In the embodiment of the present application, a K8S event listener, a Pod status change event listener, and a task status change event listener are first created; then K8S events are listened by using the K8S event listener to obtain a Pod status change event, and a corresponding Pod status update event is generated and published based on the Pod status change event; next, the Pod status update event is listened by using the Pod status change event listener, a Pod status corresponding to the Pod status update event is determined as a Pod status of a corresponding target task in the deep learning platform when the Pod status change event listener listens out the Pod status update event, and a task status update event corresponding to the target task is generated and published; and finally, the task status update event is listened by using the task status change event listener, and a current status of the target task is updated as the Pod status of the target task when the task status change event listener listens out the task status update event. In the embodiment of the present application, the K8S event, the Pod status update event, and the task status update event in a task status update process are listened and analyzed in real time by using the K8S event listener, the Pod status change event listener, and the task status change event listener separately to update a status of a task, and the foregoing steps deeply integrate capabilities of K8S, improve the real-time performance and accuracy of task status update in large-scale cluster, multi-user parallel use, and mass task running scenarios, and also improve the response speed of task status query.

Figure 5:
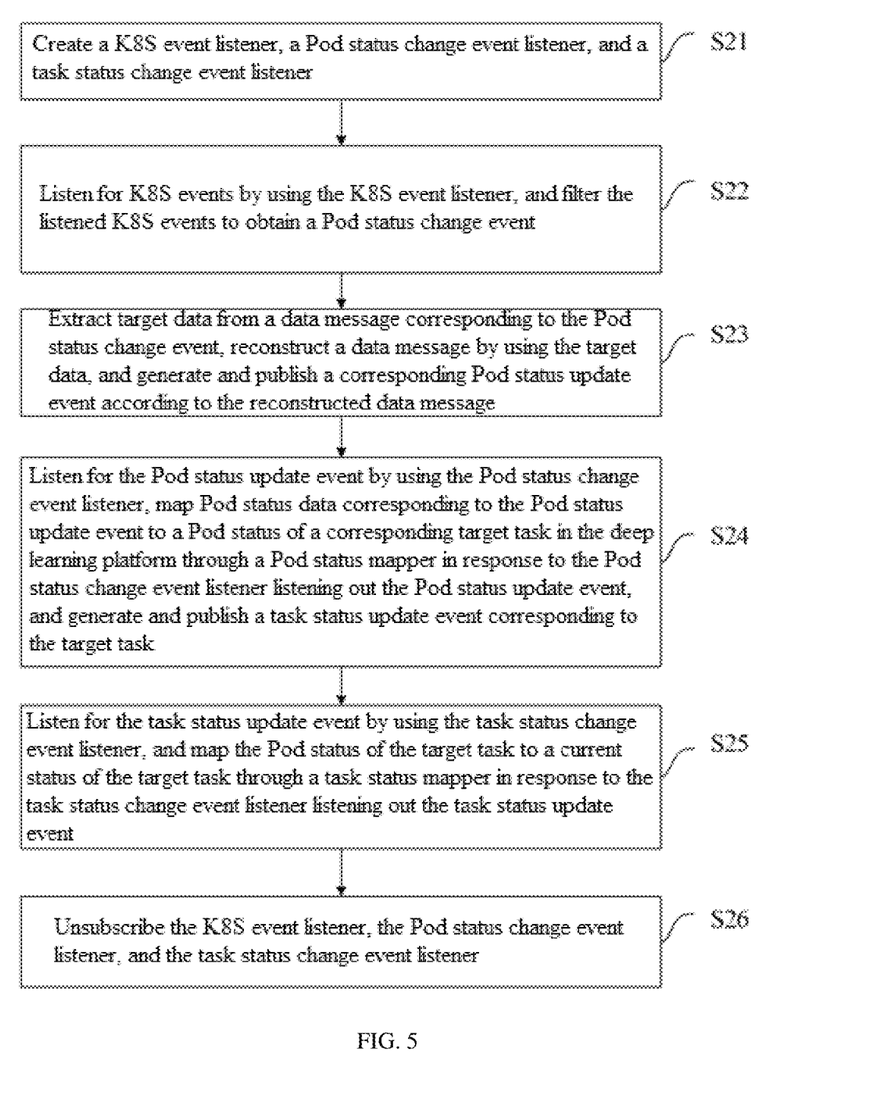
FIG. 5 is a flowchart of a certain task status updating method according to the present application.

FIG. 5 is a flowchart of a certain task status updating method according to an embodiment of the present application, applied to a deep learning platform. As shown in FIG. 5, the task status updating method includes:

S21: Create a K8S event listener, a Pod status change event listener, and a task status change event listener.

In this embodiment, the certain process of step S21 may be referred to the corresponding content disclosed in the foregoing embodiment, and will not be further elaborated herein.

S22: Listen for K8S events by using the K8S event listener, and filter the listened K8S events to obtain a Pod status change event.

In this embodiment, the K8S event listener is initiated to listen for the K8S events, and the listened K8S events are filtered to obtain the Pod status change event. The filtering process is a process of filtering out the Pod status change event from all the K8S events. The K8S events may be filtered according to space names of the listened K8S events. Generally, the K8S events are used by Kubelet to record events during the operation of a plurality of containers, and the space name consists of a recorded object and a timestamp and can reflect whether the event under the space name is a Pod status change event, so the K8S events may be filtered according to the space names of the K8S events to obtain a compliant Pod status change event.

S23: Extract target data from a data message corresponding to the Pod status change event, reconstruct a data message by using the target data, and generate and publish a corresponding Pod status update event according to the reconstructed data message.

In this embodiment, the target data are first extracted from the data message corresponding to the Pod status change event, the data message is reconstructed by using the target data, and then the corresponding Pod status update event is generated and published according to the reconstructed data message. The K8S events and the Pod status change event both exist in a format of data messages, which store a large amount of information. The K8S events contain all underlying events of the K8S platform, the data volume is relatively large, and the corresponding messages are also relatively large, so effective content, namely the target data, need to be filtered and extracted from the messages, a simplified event data message is finally generated by using the effective content and based on the Spring event mechanism of the deep learning platform, and the Pod status update event is obtained thereby and published by using the broadcaster.

S24: Listen for the Pod status update event by using the Pod status change event listener, map Pod status data corresponding to the Pod status update event to a Pod status of a corresponding target task in the deep learning platform through a Pod status mapper when the Pod status change event listener listens out the Pod status update event, and generate and publish a task status update event corresponding to the target task.

In this embodiment, the Pod status change event listener is initiated to listen for the Pod status update event, the Pod status data corresponding to the Pod status update event are mapped to the Pod status of the corresponding target task in the deep learning platform through the Pod status mapper when the Pod status change event listener listens out the Pod status update event, and the task status update event corresponding to the target task is generated and published.

S25: Listen for the task status update event by using the task status change event listener, and map the Pod status of the target task to a current status of the target task through a task status mapper when the task status change event listener listens out the task status update event.

Figure 6:
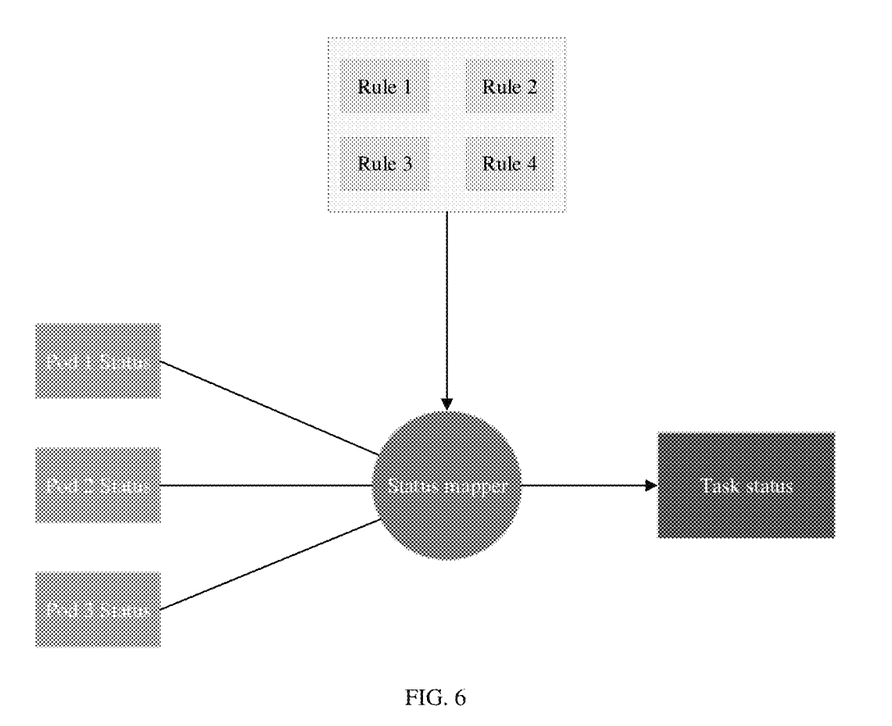
FIG. 6 is a schematic diagram of a mapping process according to the present application.

In this embodiment, on the foregoing basis, the task status change event listener is initiated to listen for the task status update event, and the Pod status of the target task is mapped to the current status of the target task through the task status mapper when the task status change event listener listens out the task status update event. The process of mapping the Pod status of the target task to the current status of the target task through the task status mapper is a response process to the preset rule described in the foregoing embodiment, namely, a process of determining the current status of the target task from the Pod status of the target task according to the preset rule. As shown in FIG. 6, when the target task corresponds to only one Pod, the target task has a unique Pod status, and the Pod status is directly determined as the current status of the target task. When the target task corresponds to N Pods (Pod1, Pod2, . . . , Podn), the target task has N Pod statuses (Pod1 status, Pod2 status, . . . , Podn status), and the preset rule may be "there is a Pod status that is running, and the current task status is running" or "there is a Pod status that is wrong, and the current task status is wrong". The preset rule may be set according to an actual service demand, and is not limited in this embodiment.

S26: Unsubscribe the K8S event listener, the Pod status change event listener, and the task status change event listener.

In this embodiment, the deep learning platform performs steps S21 to S26 in a loop to update statuses of tasks controlled by the deep learning platform in real time, thereby controlling life cycles of the tasks running in the platform. When the deep learning platform stops running, the deep learning platform unsubscribes the K8S event listener, the Pod status change event listener, and the task status change event listener to release platform resources. An unsubscribing method is called through a predefined class implementation interface to unsubscribe the K8S event listener, the Pod status change event listener, and the task status change event listener.

It can be seen that the embodiment of the present application mainly provides a task status updating mechanism for a deep learning training platform, which is suitable for task status updating scenarios in the deep learning training platform under large-scale clusters. In cases of how to accurately and effectively update a task status in real time and overcome a problem of slow response to task status query in large-scale cluster, multi-user parallel use, and mass task running scenarios, the task status updating mechanism also avoids problems when users use the deep learning platform because the training task status is not updated in a timely manner, the training task cannot accurately end, and task status information and other related information cannot be correctly displayed.

Figure 7:
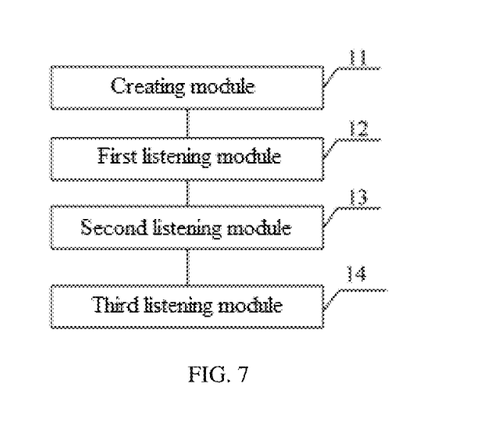
FIG. 7 is a schematic structural diagram of a task status updating apparatus according to the present application.

As shown in FIG. 7, an embodiment of the present application further correspondingly discloses a task status updating apparatus, applied to a deep learning platform, including:
a creating module 11, configured to create a K8S event listener, a Pod status change event listener, and a task status change event listener;
a first listening module 12, configured to listen for K8S events by using the K8S event listener to obtain a Pod status change event, and generate and publish a corresponding Pod status update event based on the Pod status change event;
a second listening module 13, configured to listen for the Pod status update event by using the Pod status change event listener, determine a Pod status corresponding to the Pod status update event as a Pod status of a corresponding target task in the deep learning platform when the Pod status change event listener listens out the Pod status update event, and generate and publish a task status update event corresponding to the target task; and
a third listening module 14, configured to listen for the task status update event by using the task status change event listener, and update a current status of the target task as the Pod status of the target task when the task status change event listener listens out the task status update event.

In the embodiment of the present application, a K8S event listener, a Pod status change event listener, and a task status change event listener are first created; then K8S events are listened by using the K8S event listener to obtain a Pod status change event, and a corresponding Pod status update event is generated and published based on the Pod status change event; next, the Pod status update event is listened by using the Pod status change event listener, a Pod status corresponding to the Pod status update event is determined as a Pod status of a corresponding target task in the deep learning platform when the Pod status change event listener listens out the Pod status update event, and a task status update event corresponding to the target task is generated and published; and finally, the task status update event is listened by using the task status change event listener, and a current status of the target task is updated as the Pod status of the target task when the task status change event listener listens out the task status update event. In the embodiment of the present application, the K8S event, the Pod status update event, and the task status update event in a task status update process are listened and analyzed in real time by using the K8S event listener, the Pod status change event listener, and the task status change event listener separately to update a status of a task, and the foregoing steps deeply integrate capabilities of K8S, improve the real-time performance and accuracy of task status update in large-scale cluster, multi-user parallel use, and mass task running scenarios, and also improve the response speed of task status query.

In some embodiments, the first listening module 12 includes:
a filtering unit, configured to listen for K8S events by using the K8S event listener, and filter the listened K8S events to obtain the Pod status change event;
an extraction unit, configured to extract target data from a data message corresponding to the Pod status change event; and
a reconstruction unit, configured to reconstruct a data message by using the target data, and generate and publish the corresponding Pod status update event according to the reconstructed data message.

In some embodiments, the second listening module 13 is further configured to map Pod status data corresponding to the Pod status update event to the Pod status of the corresponding target task in the deep learning platform through a Pod status mapper.

In some embodiments, the third listening module 14 is further configured to map the Pod status of the target task to the current status of the target task through a task status mapper.

In some embodiments, the task status updating apparatus further includes a destroying module, configured to unsubscribe the K8S event listener, the Pod status change event listener, and the task status change event listener.

Figure 8:
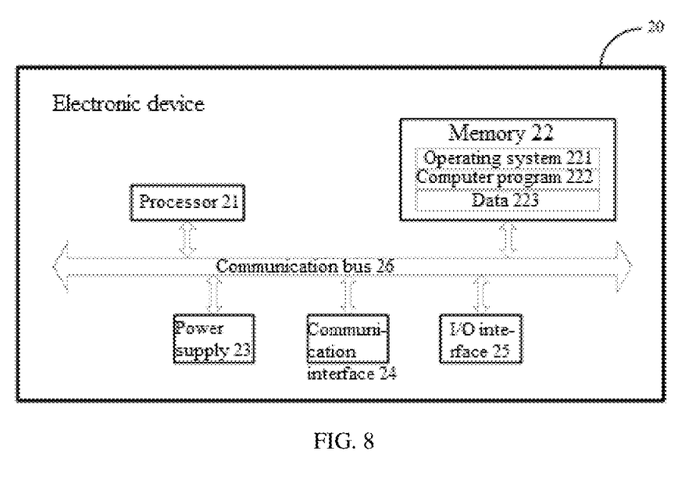
FIG. 8 is a structural diagram of a task status updating electronic device according to the present application.

Further, an embodiment of the present application provides an electronic device. FIG. 8 is a structural diagram of an electronic device 20 shown according to an exemplary embodiment, and content in the figure cannot be considered as any limitation on the scope of use of the present application.

FIG. 8 is a schematic structural diagram of an electronic device 20 according to an embodiment of the present application. The electronic device 20 may include at least one processor 21, at least one memory 22, a power supply 23, a communication interface 24, an input/output interface 25, and a communication bus 26. The memory 22 is configured to store a computer program, and the computer program is loaded and executed by the processor 21 to implement the relevant steps in the task status updating method disclosed in any of the foregoing embodiments.

In this embodiment, the power supply 23 is configured to provide working voltage for all hardware devices on the electronic device 20; the communication interface 24 can create a data transmission channel between the electronic device 20 and an peripheral device, and follows any communication protocol that can be applied to the technical solutions of the present application, which is not limited here; and the input/output interface 25 is configured to obtain outside input data or output data to the outside, and a certain interface type may be selected according to an application requirement and will not be limited here.

In addition, the memory 22, as a carrier for resource storage, may be a read-only memory, a random access memory, a magnetic disk, an optical disk, or the like. Resources stored in the memory 22 may include an operating system 221, a computer program 222, status change data 223, and the like. A storage manner may be temporary storage or permanent storage.

The operating system 221 is configured to manage and control the hardware devices on the electronic device 20 and the computer program 222 to operate and process mass status change data 223 in the memory 22 by the processor 21, and may be a Windows Server, Netware, Unix, Linux, or the like. The computer program 222 may further include computer programs that can be used to complete other certain tasks, in addition to the computer program that can be used to complete the task status updating method executed by the electronic device 20 in any of the foregoing embodiments. The data 223 may include status change data collected by the electronic device 20.

Further, an embodiment of the present application further discloses a storage medium, the storage medium storing a computer program, and the steps of the task status updating method disclosed in any of the foregoing embodiments being implemented when the computer program is loaded and executed by a processor.

The embodiments in this specification are described in a progressive manner. The description of each of the embodiments focuses on differences from other embodiments, and reference may be made to each other for the same or similar parts among the embodiments. The apparatus disclosed in the embodiment corresponds to the methods disclosed in the embodiments and is thus described relatively simply, and reference may be made to the description of the methods for the related parts.

Finally, it should be noted that in this specification, relationship terms such as first and second are used only to differentiate an entity or operation from another entity or operation, and do not necessarily require or imply that any actual relationship or sequence exists between these entities or operations. Moreover, the terms "include" and "contain", or any of their variants are intended to cover a non-exclusive inclusion, whereby a process, method, article, or device that includes a series of elements not only includes those elements but also includes other elements that are not expressly listed, or further includes elements inherent to such process, method, article, or device. In the absence of more limitations, an element defined by "include a . . . " does not exclude other same elements existing in the process, method, article, or device including the element.

The above details the task status updating method and apparatus, the device, and the storage medium provided in the present application. The principles and implementations of the present application are described herein through examples. The descriptions of the foregoing embodiments are merely provided to help understand the method and core idea of the present application. In addition, a person of ordinary skill in the art may change the implementations and application scopes according to the idea of the present application. Therefore, the content of this specification shall not be construed as a limit to the present application.

What is claimed is:

1. A task status updating method, applied to a deep learning platform, comprising:
   creating a K8S event listener, a Pod status change event listener, and a task status change event listener;
   listening for K8S events by using the K8S event listener to obtain a Pod status change event, and generating and publishing a corresponding Pod status update event based on the Pod status change event;
   listening for the Pod status update event by using the Pod status change event listener, determining a Pod status corresponding to the Pod status update event as a Pod status of a corresponding target task in the deep learning platform in response to the Pod status change event listener listening out the Pod status update event, and generating and publishing a task status update event corresponding to the target task; and
   listening for the task status update event by using the task status change event listener, and updating a current status of the target task as the Pod status of the target task in response to the task status change event listener listening out the task status update event.

2. The task status updating method according to claim 1, wherein the step of listening for K8S events by using the K8S event listener to obtain a Pod status change event comprises:
   listening for the K8S events by using the K8S event listener, and filtering the listened K8S events to obtain the Pod status change event.

3. The task status updating method according to claim 2, wherein the step of filtering the listened K8S events comprises:
   filtering the K8S events according to space names of the listened K8S events.

4. The task status updating method according to claim 1, wherein the step of generating and publishing a corresponding Pod status update event based on the Pod status change event comprises:
   extracting target data from a first data message corresponding to the Pod status change event, and reconstructing a second data message by using the target data; and
   generating and publishing the corresponding Pod status update event according to the reconstructed second data message.

5. The task status updating method according to claim 4, wherein effective content is filtered and extracted from the first data message, and a simplified event data message is generated by using the effective content and based on a Spring event mechanism of the deep learning platform.

6. The task status updating method according to claim 1, wherein the step of determining a Pod status corresponding to the Pod status update event as a Pod status of a corresponding target task in the deep learning platform comprises:
mapping Pod status data corresponding to the Pod status update event to the Pod status of the corresponding target task in the deep learning platform through a Pod status mapper.

7. The task status updating method according to claim 1, wherein the step of updating a current status of the target task as the Pod status of the target task comprises:
mapping the Pod status of the target task to the current status of the target task through a task status mapper.

8. The task status updating method according to claim 1, wherein after the step of updating a current status of the target task as the Pod status of the target task, the method further comprises:
unsubscribing the K8S event listener, the Pod status change event listener, and the task status change event listener.

9. The task status updating method according to claim 8, wherein the step of unsubscribing the K8S event listener, the Pod status change event listener, and the task status change event listener comprises:
calling an unsubscribing process through a predefined class implementation interface.

10. The task status updating method according to claim 1, wherein the K8S events are stored in Etcd, and record various major events during cluster operation.

11. The task status updating method according to claim 1, wherein a listening mechanism matches a listener and an event, and wherein the Pod status change event listener is created based on a Spring event mechanism of the deep learning platform to listen for Pod status update time.

12. The task status updating method according to claim 1, wherein a listening mechanism matches a listener and an event, and wherein the task status change event listener is created based on a Spring event mechanism of the deep learning platform to listen for task status update time.

13. An electronic device, wherein the electronic device comprises a processor and a memory, wherein the memory is configured to store a computer program, and the processor is configured to execute the computer program, and upon execution of the computer program, is configured to:
create a K8S event listener, a Pod status change event listener, and a task status change event listener;
listen for K8S events by using the K8S event listener to obtain a Pod status change event, and generate and publish a corresponding Pod status update event based on the Pod status change event;
listen for the Pod status update event by using the Pod status change event listener, determine a Pod status corresponding to the Pod status update event as a Pod status of a corresponding target task in a deep learning platform in response to the Pod status change event listener listening out the Pod status update event, and generate and publish a task status update event corresponding to the target task; and
listen for the task status update event by using the task status change event listener, and update a current status of the target task as the Pod status of the target task in response to the task status change event listener listening out the task status update event.

14. The electronic device according to claim 13, wherein the processor, upon execution of the computer program, is further configured to:
listen for the K8S events by using the K8S event listener, and filter the listened K8S events to obtain the Pod status change event.

15. The electronic device according to claim 14, wherein the processor, upon execution of the computer program, is further configured to:
filter the K8S events according to space names of the listened K8S events.

16. The electronic device according to claim 13, wherein the processor, upon execution of the computer program, is further configured to:
extract target data from a first data message corresponding to the Pod status change event, and reconstruct a second data message by using the target data; and
generate and publish the corresponding Pod status update event according to the reconstructed second data message.

17. The electronic device according to claim 13, wherein the processor, upon execution of the computer program, is further configured to:
map Pod status data corresponding to the Pod status update event to the Pod status of the corresponding target task in the deep learning platform through a Pod status mapper.

18. The electronic device according to claim 13, wherein the processor, upon execution of the computer program, is further configured to:
map the Pod status of the target task to the current status of the target task through a task status mapper.

19. The electronic device according to claim 13, wherein the processor, upon execution of the computer program, is further configured to:
unsubscribe the K8S event listener, the Pod status change event listener, and the task status change event listener.

20. A non-transitory computer-readable storage medium, storing computer executable instructions, and the computer executable instructions, when executed by a processor, are configured to cause the processor to:
create a K8S event listener, a Pod status change event listener, and a task status change event listener;
listen for K8S events by using the K8S event listener to obtain a Pod status change event, and generate and publish a corresponding Pod status update event based on the Pod status change event;
listen for the Pod status update event by using the Pod status change event listener, determine a Pod status corresponding to the Pod status update event as a Pod status of a corresponding target task in a deep learning platform in response to the Pod status change event listener listening out the Pod status update event, and generate and publish a task status update event corresponding to the target task; and
listen for the task status update event by using the task status change event listener, and update a current status of the target task as the Pod status of the target task in response to the task status change event listener listening out the task status update event.

\* \* \* \* \*